March 29, 1966
D. J. TIGHT
3,243,128
METHOD AND APPARATUS FOR DISPERSING
PIGMENTS IN LIQUID VEHICLES
Filed Aug. 5, 1963
2 Sheets-Sheet 1
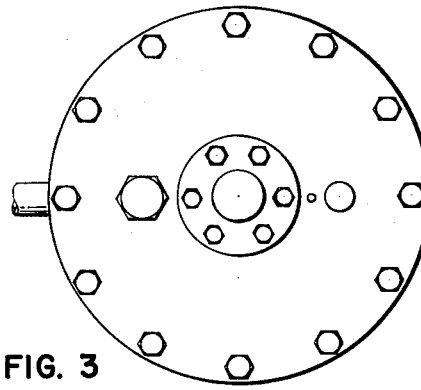
FIG. 3
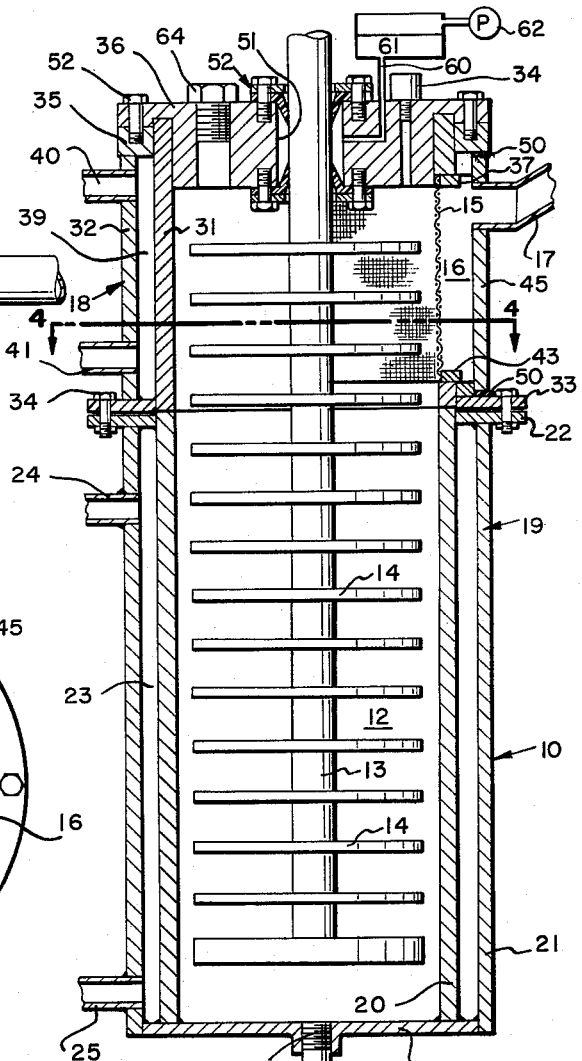
FIG. 1
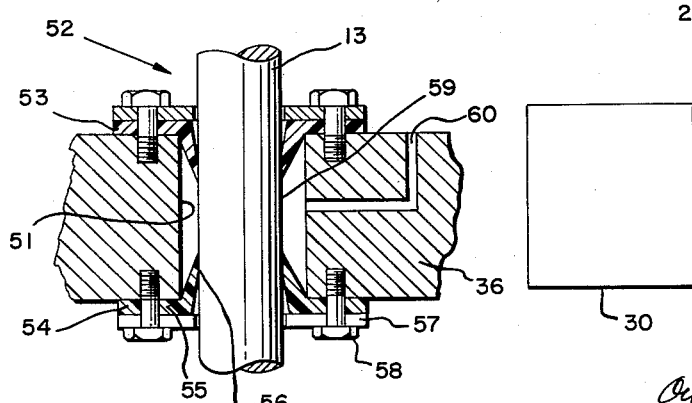
FIG. 4
FIG. 2
INVENTOR
DEXTER J. TIGHT
BY
Owen, Wickersham & Erickson
ATTORNEYS

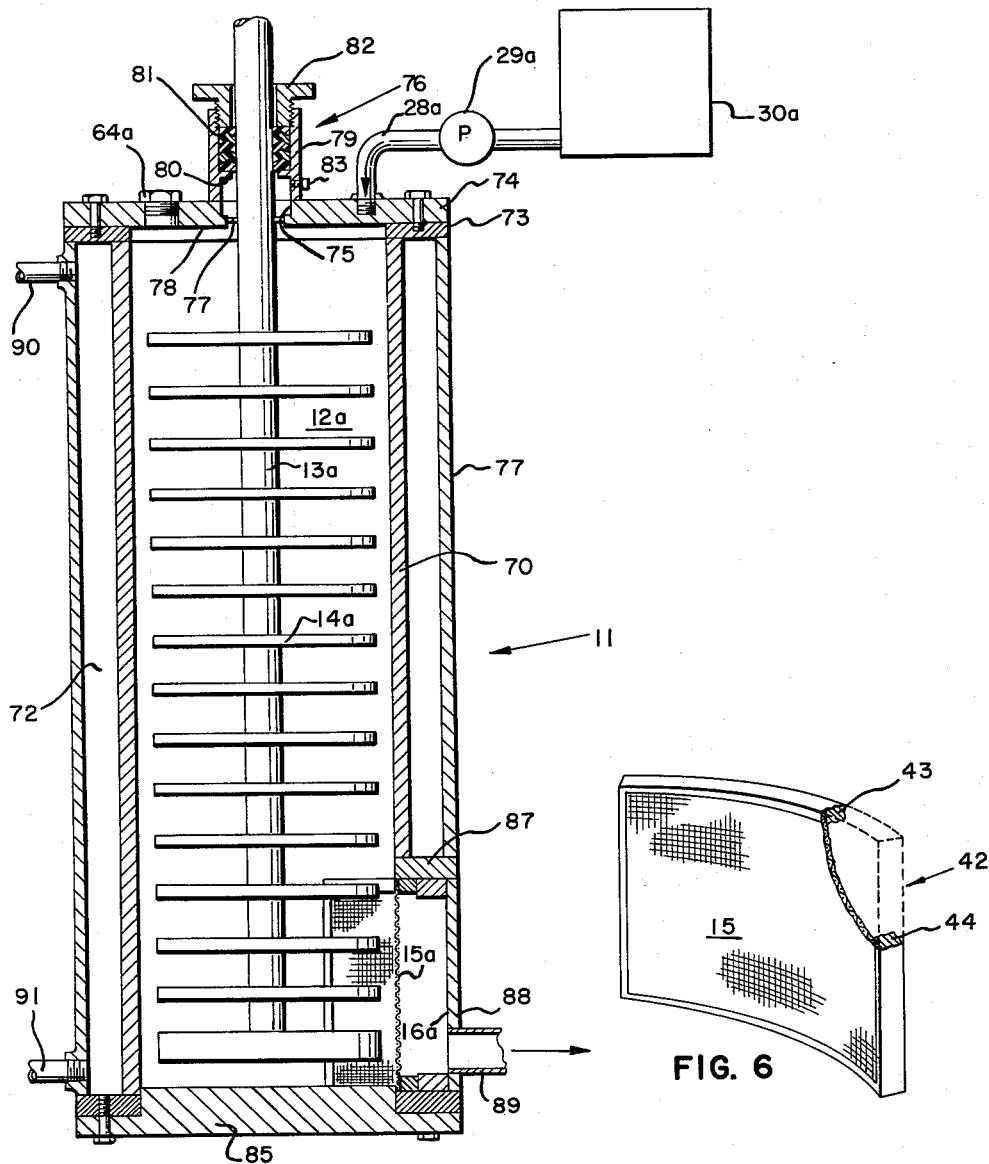

United States Patent Office 3,243,128
Patented Mar. 29, 1966

3,243,128
METHOD AND APPARATUS FOR DISPERSING PIGMENTS IN LIQUID VEHICLES
Dexter J. Tight, Woodside, Calif., assignor to Morehouse-Cowles, Inc., Los Angeles, Calif., a corporation of California
Filed Aug. 5, 1963, Ser. No. 299,746
3 Claims. (Cl. 241—65)

This invention relates to an improved method and apparatus for deagglomerating pigments and dispersing them in vehicles such as resins, varnishes, oils and solvents or the like, as used in the manufacture of paint and other products.

In manufacturing paint it is necessary to deagglomerate and disperse pigment materials in liquids or film-forming vehicles to form smooth, non-granular films having suitable characteristics as to color and hiding power. In the early prior art various types of paint mills employing steel balls, rollers, and other grinding means were used to process pigment materials. In a more recently developed method and apparatus for accomplishing the deagglomerating and dispersing of pigments, a quantity of sand as the grinding media is retained in a vessel and agitated by rotating discs as the pigment material is passed through the vessel. A typical apparatus for carrying out this sand grinding process is described in the U.S. Patent Numbers 2,855,156 and 2,581,414 to Hochberg.

While the aforementioned Hochberg process and apparatus represented a step forward in the art, it was found to have some significant disadvantages and limitations with respect to the processing of certain products. A general object of the present invention therefore is to provide an improved apparatus utilizing the sand agitation principle for deagglomerating and dispersing pigment materials in vehicles.

One particular problem with the aforementioned prior art devices was that they were limited in output capacity when operated to process certain mill base slurries of unusually high viscosity or thixotropic in nature. In operating these devices the input rate for the grind desired was often faster than the capacity of the outlet screen. In this situation the mixture of sand and slurry would push out over the top of the mill unless the input pump rate was decreased to the capacity of the screen. However, slowing the input pump speed not only reduced the output of the mill but it also increased the dwell time of the pigment in the mill which with some materials produced highly undesirable results. Thus, a more specific object of my invention is to provide an improved pigment dispersing mill capable of processing slurries of combined pigment and vehicle having an unusually high viscosity, as for example stipple or paste paints, heavy one coat enamels and undercoats, colors in oil, inks, and many low grind products which require a short dwell time in the mill.

Another problem with the aforementioned prior art pigment processing apparatus was that during its operation with certain vehicles a large amount of air became entrapped in the material being processed within the mixing chamber. In such cases as the processed pigment and vehicle left the apparatus it became permeated with air bubbles which remained in the material as it was collected in a supply container. Thus, in products which were prepared for use by the manufacturer directly from the mill the processed material had to be deaerated by additional equipment before it could be used or placed in containers. My invention solves this important problem and provides a new method and apparatus utilizing the sand agitation principle that produces a dispersed pigment and vehicle completely free of air bubbles.

Still another problem with pigment dispersing apparatus of the sand agitation type heretofore used was that the screen at the outlet located at the top of the mixing vehicle for separating the sand was constantly exposed to the surrounding atmosphere. As a result, portions of the dispersed material passing through it often dried and solidified or formed "skins" that ultimately blocked off portions of the screen and reduced the flow rate. This made it necessary for the screen to be removed and cleaned frequently, particularly when a different color of pigment was to be processed.

It is therefore another object of the present invention to provide an improved pigment deagglomerating and dispersing apparatus that is unusually easy to clean and service. In my apparatus the screen is not exposed to air either while in use or when shut down, and thus it never dries off and does not require any cleaning during operation. When different colored batches are to be processed the apparatus can be cleaned between batches by circulating solvent through it without requiring washing or the removal of the screen. Yet, if the screen requires changing for any other reason, it can be quickly replaced by the removal of a single cover plate.

Another object of my invention is to provide an improved method and apparatus for deagglomerating and dispersing pigment materials in a vehicle wherein the volume ratio of the mixture of media and a slurry of pigment and vehicle within the vessel does not change with different input rates. This is accomplished in the present invention by providing a mixing vessel that is completely enclosed except for the inlet and the outlet for the processed pigment and vehicle. Thus, since the mixture of pigment, vehicle and grinding media completely fills the mill enclosure during operation of the apparatus, the volume ratio of the media of pigment and vehicle remains constant regardless of the rate of flow through the mill.

Still another object of the invention is to provide an improved apparatus for dispersing pigments having a media separating screen about which the temperature can be controlled, when required, to the desired level. This feature of the invention enables my apparatus to be used efficiently for pigments and vehicle which are sensitive to coagulation at high temperatures and yet which require high heat generating rates of agitation by cooling the mill around part of the screen area. It also enables my device to be used for dispersing materials that require additional heat during agitation such as wax, at which time heat in the form of steam or hot water can be applied around part of the screen area as well as around the vessel.

Another object of my invention is to provide an assembly incorporating the aforementioned features and advantages, and which can readily be attached to existing pigment dispersing devices.

One important problem which arose in providing a closed mixing chamber capable of operating under increased internal pressure according to the invention was that of sealing the rotating shaft for the agitators so as to prevent any of the mixed grinding media and pigment from penetrating the shaft bearing and while also preventing any air from entering the chamber around the shaft. Because of the abrasive nature of the pigments being dispersed in the mill, ordinary shaft seals tended to wear rapidly and allowed the shaft to be scored. It is therefore a further object of the present invention to provide a unique shaft sealing means in combination with an enclosed pigment dispersion mill, and more particularly a means capable of preventing the mixture of grinding media and pigment from getting between the shaft and its bearing during operation of the mill, and a sealing means that is both reliable and long lasting.

The aforementioned and other important advantages are achieved in my invention by a pigment dispersing apparatus that includes a sealed mixing chamber so that with a pump supplying a steady stream of pigment and vehicle into the device, a greatly increased output rate can be attained. Also, the amount of dwell of the mixture within the chamber can be controlled to the amount necessary to produce the desired quality. Moreover, no air is allowed to enter the vessel during the agitation process, and the combined pigment vehicle leaving the vessel is completely free from air bubbles. By sealing the vessel containing the sand and material being processed, the size of the screen can be drastically reduced and in accordance with the invention it may be provided with a jacketed structure so that it can be either cooled or heated when required to maintain the proper temperature around the screen.

A further understanding of the invention together with more of its objects and advantages will appear from the following detailed description presented in accordance with 35 U.S.C. 112. The use of certain specified materials and the utilization of some details of construction which appear in this description are to be considered as illustrative examples only rather than as limitations upon the invention or upon the appended claims.

In the drawings:

FIG. 1 is a view in side elevation and in section of an apparatus embodying the principles of the invention adapted for bottom feed and for discharge of the processed material at the top;

FIG. 2 is an enlarged fragmentary view in section showing details of one embodiment of a shaft seal for the apparatus of FIG. 1;

FIG. 3 is a top plan view of the apparatus shown in FIG. 1;

FIG. 4 is a plan view in section taken along the line 4—4 of FIG. 1;

FIG. 5 is a view in elevation and in section of a pigment dispersing apparatus according to the invention having a top feed and a discharge outlet at the bottom end and using a different shaft sealing arrangement.

FIG. 6 is a view in perspective of a removable screen for use in the apparatus shown in FIG. 1 with a portion broken away to show the screen frame members.

Referring now to the drawings, in FIGS. 1 and 5 are shown two separate but similar sand mills 10 and 11 both of which embody the principles of the present invention. The mill 10 in FIG. 1 utilizes a bottom feed arrangement wherein the combined pigment and vehicle to be processed enters at or near its bottom end, and the dispersed material is discharged at its top end. In accordance with an important feature of the invention the mill 10 is constructed so as to provide an enclosed dispersing chamber 12 that is completely sealed from any influx of air during the operation of the apparatus. A motor driven agitator shaft 13 extends downward into the chamber 12 along its cylindrical axis, and attached thereto are a plurality of spaced apart impellers 14 or agitator discs. The impellers 14 are preferably circular or annular with radial spokes, and they have a diameter somewhat smaller than that of the chamber 12. At the upper end of the chamber 12 is a partially circumferential internal screen 15 at one side of the chamber 12 through which the combined pigment and vehicle must pass after having traveled through a mass of agitated media or sand within the chamber. Adjacent to the screen 15 on the side of the chamber 12 is a relatively small discharge chamber 16 which is sealed around the screen 15 and is thus enclosed except for an outlet conduit 17 for discharging the processed pigment and vehicle into a supply container.

In the embodiment of FIG. 1, the chamber 12 is formed by upper and lower connectable assemblies 18 and 19. The mill 10 could be constructed as a single assembly, but I have purposely shown the two assembly constructions to illustrate how my invention can be conveniently applied in modifying existing pigment dispersing apparatus of the prior art, as illustrated typically in FIG. 1 of the patent to Hochberg et al., 2,855,156. An integral type construction is illustrated in connection with the top-feed embodiment of my invention shown in FIG. 5.

It will be apparent therefore that the lower assembly 19 of the mill 10 is similar to the apparatus shown in the aforementioned patent and comprises merely a cylindrical housing 20 which forms the lower part of the chamber 12. A circumferential jacket 21 is spaced radially outwardly from the housing 20 and these concentric members 20 and 21 are connected together at their upper ends by an upper annular member 22. The jacket member 21 thus forms an annular space 23 around the chamber 12 through which a cooling or heating medium may be circulated during the operation of the mill 10 by means of upper and lower conduit fittings 24 and 25.

At the lower end of the mill 10 is a bottom closure plate 26 which is provided with a central threaded opening 27 to receive an inlet pipe 28 adapted to supply a continuous flow of mill base material, comprising a premix of pigment and vehicle. The premix material is supplied under pressure to the chamber 12 by means of a pump 29 connected in the conduit 28 which extends from a suitable supply container 30.

The upper assembly 18 of the apparatus 10 is adapted to be removably connected to the cylindrical housing 20 and its jacket 21 and, as shown in FIGS. 1 and 4, comprises an inner cylindrical wall member 31 having the same radius as the cylindrical housing 20 and an outwardly spaced concentric jacket member 32. At their lower ends the wall members 31 and 32 are connected as by welding to an annular member 33. The member 33 extends radially outwardly from the jacket 32 and is adapted to connect the upper assembly 18 to the annular member 22 of the lower assembly 19 by means of a series of circumferentially spaced apart bolts or clamps 34. Connecting the upper edges of the wall members 31 and 32 is an annular ring 35 to which is mounted a circular cover plate 36 for the mill 10. The inner wall member 31 has an opening 37 on one side in which is installed the screen 15. The outer jacket member 32 is semi-cylindrical and is connected at its ends by vertical wall members 38 attached to the inner wall 31 and the annular members 33 and 35. Between the wall members 31 and 32 is thus formed a chamber 39 in which a coolant can be circulated through inlet and outlet conduits 40 and 41.

As shown in FIGS. 1 and 4, the screen 15 has the same curvature as and fits within the opening 37 of the inner wall member 31. It is preferably mounted within a frame 42 formed by upper and lower curved frame segments 43 that are connected to vertical end frame members 44 which are secured to the outside edges of the screen (FIG. 6). Spaced outwardly from the screen 15 and concentric therewith on the mill 10 is a curved semi-cylindrical side cover plate 45 which is removably attached to the vertical end wall members 38 and between the annular members 33 and 35 to form the closed discharge chamber 16 around the outside of the screen 15. Extending from the convex side of the plate 45 is the outlet conduit 17 for discharging the processed pigment and vehicle. Any suitable means may be utilized for attaching the removable cover plate 45. For example, as shown in FIG. 4, the plate is provided with a pair of vertical side brackets 46 near its ends having openings to receive threaded studs 47 fixed to and extending from a pair of vertical side brackets 48 fixed to the outer jacket member 32. Threaded nuts 49 are then taken up on the studs 47 to retain the cover plate 45 in a tight sealing engagement with the vertical wall members 38. A suitable gasket seal 50 of yieldable material may be provided around the edges of the side cover plate to prevent any leakage therefrom.

The upper end cover plate 36 has a circular shape and a centrally located bore 51 that forms a bearing for the motor driven shaft 13 having the agitating impellers 14. The cover plate 36 is retained in place on the ring member 35 by a series of circumferentially spaced apart machine screws 52. Between the shaft and the cover plate 36 is provided a sealing device 52 which prevents any leakage from the chamber 12 along the shaft 13 of the mixed grinding media and the mill base, and also prevents any air from entering the chamber 12. This sealing device is an important feature of the present invention since it overcomes the problem of increased shaft wear that could be caused by penetration of the bearing and seal of the material within the mixing chamber 12. As shown in detail in FIG. 2, the sealing device 52 comprises two flange seals 53 and 54 that are fastened to the upper and lower surfaces of the cover plate 36 around the bore 51. Each flange seal is of yieldable elastomeric material and has an annular portion 55 connected to a tapered tubular portion 56 which for each seal extends into the bore 51 from the upper and lower sides of the cover plate 36. The annular portions 55 of the flange seals 53 and 54 are held tightly against the cover plate 36 by rigid washers 57 secured by spaced apart machine screws 58. The cover plate has a thickness at least around the central bore 51 that causes the flange seals 53 and 54 to be spaced apart within the bore, thereby forming an annular chamber 59 within the bore 51 around the shaft 13. In FIGS. 1 and 2 the chamber 59 is exaggerated in size for illustrative purposes. A passageway 60 extends from the upper surface of the cover plate 36 and into the annular chamber 59 between the flange seals and through the passageway is supplied a lubricating oil of the type that is compatible with the paint material being processed within the chamber 12, such as mineral spirits or glycerol oil. This oil 61 is maintained within the chamber 59 at a pressure that is somewhat greater than the internal operating pressure within the chamber 12 (e.g. 2 to 20 p.s.i.) by some suitable pressure source 62. Normally, the oil remains in the chamber 59 within the bore and causes the tubular portions 56 of the flange seals to maintain a snug sealing fit around the shaft that prevents penetration of any pigment material or sand into the annular chamber. The overpressure applied to the chamber may actually cause a slight flow of the lubricating oil from the annular chamber 59 into the mixing chamber 12 which flushes the lower seal 54 free of any particles. The sealing device 52 just described is one embodiment that has solved the shaft sealing and wear problem. Other sealing devices could be used within the scope of the invention and another embodiment thereof will be described later with reference to FIG. 5.

Also fixed to the upper cover plate is a pressure sensing member 63 of the conventional type which can be connected to the motor to automatically cut it off should the pressure within the mixing chamber for some reason rise beyond the normal pressure required. A removable inlet plug 64 is threadedly secured to the cover plate 36 to provide an opening for supplying the grinding sand charge to the chamber 12.

From the foregoing description of the mill 10, it is thus seen that the chamber 12 is completely enclosed and sealed during the mixing or griding operation except for the inlet pipe 26 at the bottom which feeds a steady flow of pigment material to be processed into the chamber and the outlet pipe 17 through which the dispersed material is discharged.

In the mill 11 utilizing a top-feed arrangement shown in FIG. 5, the chamber 12a is formed from a cylindrical wall member 70 into which extends a motor driven agitator shaft 13a having a plurality of spaced apart impellers 14a as in the mill 10. A circumferential jacket member 71 is spaced radially outwardly from the cylindrical wall 70 and forms an annular space 72 around the chamber 12a. At the upper end of the mill 11 the cylindrical wall and jacket members 70 and 71 are connected by an annular member 73 to which is bolted and sealed a removable cover plate 74. The cover plate 74 has a removable plug 64a providing access for the sand charge, an inlet conduit 28a for supplying the material to be processed through a pump 29a from a supply source 30a. A centrally located bore 75 is provided on the cover plate 74 through which the agitator shaft 13a extends, and attached to the cover plate around the bore 75 is a shaft sealing device 76.

The sealing device 76 includes a bearing ring 77 of low friction material such as Teflon which is supported within the lower end of the bore 75. Above the ring 77 the bore 75 increases to a diameter considerably greater than the shaft 13a to form an annular chamber 78 around it. Also forming the upper part of the chamber 78 is a sleeve member 79 that is fixed to the upper sides of the cover plate 74 around the bore 75. Spaced downwardly from the upper end of the sleeve member is an internal shoulder 80 forming a normal running clearance with the shaft 13a. Above the shoulder 80 are a series of annular packing members 81 which may be of any suitable type such as the well known V-type which maintain a snug fit when compressed axially. Retaining the packing members 81 against the shoulder 80 is an end cap 82 that is threadedly connected to the upper end of the sleeve 79. On the side of the sleeve 79, a standard grease fitting 83 is provided through which a compatible heavy oil or grease can be supplied under pressure to the chamber 78. In operation, the maintenance of grease within the chamber 78 prevents any migration of the abrasive material upward along the shaft from the chamber 12a so that an effective seal is maintained around the shaft without excessive wear thereto. The above described sealing device 76, like the sealing device 52, shown on the mill 10, has proven to be successful in preventing an unnecessary wear to the shaft 13a even after long periods of use and despite the fact that with highly abrasive pigment material and grinding media within the chamber 12a is constantly under pressure.

The lower end of the mill 11 has a construction similar to the upper portion 18 of the mill 10. The cylindrical wall 70 and the jacket member 71 are fixed at their lower end to a circular bottom plate 85. Both the inner wall 70 and its jacket 71 have radially aligned openings formed by cutout portions. At the sides and the upper edges of the cutout portions are a pair of vertical members 86 and a curved upper wall member 87 that connected the cylindrical wall 55 and its jacket 56. Across the inner opening in the wall 70 is installed a removable curved screen 15a through which the processed mixed pigment and vehicle can pass after working its way downward through the chamber 12a. The screen 15a is preferably mounted in a frame 42a similar to that shown in FIG. 6, and is adapted to be retained in place by a curved cover plate 88. The cover plate may be attached to the mill 11 by bolts or clamps 72 in any suitable manner as shown in FIG. 1 to facilitate its easy removal when necessary. As in the mill 10, the cover plate 88 completely covers and seals the screen 15a within the mill 11 and is spaced away from it so that a discharge chamber 16a is formed adjacent the outside of the screen. An outlet conduit fitting 89 is attached to the cover plate 88 through which the processed material from the discharge chamber 16a is allowed to flow through an opening 74. The jacket 71 is provided with outlet and inlet fittings 90 and 91 at the top and bottom of the mill 10 so that the chamber 12a can be temperature controlled by circulating fluid through the annular space 72.

It is apparent that many details of construction of the mills 10 and 11 can be altered within the scope of the invention. Similarly, various materials can be used in their construction, although it is preferred that the various elements be formed from sheet metal.

The method for operating the mills 10 or 11 is essentially the same in both cases and according to the invention differs from the method used heretofore in pigment dispersing apparatus in that the agitation of the sand takes place within an enclosed chamber while the premix pigment and vehicle is forced through the sand under pressure at a controlled rate, and completely fills the chamber. In addition to the aforementioned basic steps the entire mixing chamber and particularly the area around the screen is temperature controlled during the operation of the apparatus. In the mill 10 shown in FIGS. 1-4 the chamber 12 is first filled with the desired amount of media such as sand or glass beads, etc. Generally, Ottawa sand is preferred, which is a well-known commercially available media. It may be used in any size from 10 to 14 mesh depending on the type of pigment that is to be processed and the results desired when the sand is filled to approximately the top of the lower assembly 19, and the pump 29 can be actuated to supply the premix of pigment and vehicle through the conduit 28 to the bottom of the chamber 12 at the desired pressure and flow rate. The motor driven agitator shaft 13 is now rotated, and as the mill base or premix of pigment and vehicle is forced up through the agitated sand, the pigment is progressively deagglomerated or broken down to the proper particle size and thoroughly dispersed within the vehicle. As the mill base initially flows through the quantity of sand it fills the voids between the sand particles and the total mixture gradually rises from the chamber portion formed by the lower assembly 19 and fills the chamber portion of the upper assembly 18 having the screen 15 on one side. When the equilibrium pressure is established within the chamber 12 a steady flow of processed material is forced through the screen into the discharge chamber 16 which becomes filled and ultimately discharges out the exit conduit 17. While the process continues, a suitable cooling or heating fluid can be applied to the conduit fittings 24 and 40 to circulate through the annular spaces 23 and 39 around both the lower assembly 18 and the upper assembly 19 to maintain the entire chamber 12 at the proper temperature. This is an important feature because it enables the entire screen area to be temperature controlled and prevents any hot spots from developing that could cause coagulation of the mill base and blocking or clogging of the screen.

After a batch has been completed in the mill 10 the apparatus is easily cleaned by merely pumping solvent through the device. Thus, the necessity of removing and manually cleaning a cylindrical screen as required in prior art bottom feed devices has been completely eliminated. The ease of this cleaning operation is due in part to the fact that the screen is constantly in contact with the wet pigment and vehicle or solvent and never in contact with air during the operation of the device. There is thus no chance for the pigment to dry and form skins and hardened layers that can clog the screen either inside or outside.

The operation of the mill 11 is similar to that of mill 10 except that the premix of pigment and vehicle is fed through the inlet pipe 28a at the top of the mill and flows downward through the apparatus. Since the mill 11 is also completely sealed, the effect of gravity is negligible and the flow of the pigment material through the apparatus is controllable by a pump 29a. Here again the material after having passed through the body of sand as it is being agitated by the discs 14a passes through the screen 15a having a relatively small area and into the adjacent discharge chamber 16a before leaving through the discharge pipe 89.

It should be noted that although the pump 29 is shown in FIG. 1 in an arrangement where it applies a positive pressure to force the combined pigment and vehicle into the mill, the pump could be placed in the outlet conduit of either mill 10 or 11. Due to the fact that the mills 10 and 11 are sealed in accordance with the invention, the pump could thus pull the premix through the mill by suction. This arrangement has the advantage of utilizing the pump to transfer the processed material to a remote location without having to exert excess pressure within the mill.

When both of the mills 10 and 11 are in operation, the mixing chambers are completely filled with the dispersing media and the premix material being processed. Since the mixing chamber is completely confined there is no chance of any media escaping, and the pigment is processed through at a rate proportional to the fluid pressure being applied to it by the pump. Thus, my invention provides an increased output rate that was heretofore unavailable with prior art devices. Moreover, in the present invention, air cannot enter the mixing chamber to cause an aerated product, and the volume ratio of media to the premix always remains constant, which assures an efficient uniform grinding action throughout the entire batch.

The following examples are illustrative of the invention.

EXAMPLE I

*Mill base for epon resin enamel*

Titanium oxide _____ pounds__ 300
Baker's MPA (multiple purpose additive
  60% dispersing agent) _____do____ 7
106 talc (magnesium silicate) _____do____ 120
Epon resin, 60% vehicle solids _____gallons__ 32
Grind desired—6 (North scale); viscosity 110 K.u.'s at 77° F.

In this test run a laboratory type ½ gallon, 4 disc rotor top feed mill was first used with a 4½ pound charge of 20 to 30 mesh sand. With this mill the rotor was turned at a constant speed of 2400 r.p.m. The above premix was poured into the top of the mill as rapidly as the dispersion flowed out through the screen at the bottom of the mill. The flow rate achieved was 2 gallons per hour with a grind rating of 6.

In a comparative test run, a mill having the same specifications as the above mill but reconstructed in accordance with the principles of the present invention was used, with the top closed and the rotor shaft sealed. The premix was pumped into the mill under pressure at a constant rate, maintaining a chamber pressure of 4 p.s.i. The desired grind rating of 6 (North scale) was obtained at an output rate of 6 gallons per hour, an increase of 200% over the non-sealed type of mill.

In another test run the same formula as set forth above was used with a standard open type bottom feed 3 gallon mill with a shaft speed of 1750 r.p.m. The sand charge was 27 pounds of 20 to 30 mesh sand. Here, the sand mixture was pushed out of the top of the mill at an input flow rate of premix of 24 gallons per hour. When the input flow was reduced to 20 gallons per hour, the sand mixture remained within the top screen area in the aforesaid prior art type of bottom feed mill.

Using this same formula with a 3 gallon bottom feed mill constructed according to the invention, that is with an enclosed screen and a sealed shaft, an output rate of 36 gallons per hour developed a product having a grind rate of 6 on the North scale. The pressure during this test was 6½ p.s.i. within the mixing chamber.

EXAMPLE II

*Mill base for white backing enamel*

Titanium oxide _____pounds__ 87½
Aluminum silicate _____do____ 5
Bentone 34 _____do____ 1
Medium oil alkyd, 36% vehicle solids ___gallons__ 7
Grind desired—7½ (North scale); viscosity 90 K.u.'s at 77° F.

In this test the above mixture was pumped into the 3 gallon open type bottom feed mill and the input rate was held just so the sand mixture would not overflow the screen at the top. This input rate was found to be 14 gallons per hour, and the grind produced had a value of 8 on the North scale.

Using a sealed mill of the type according to the invention, the input pump speed was increased so that an output of 26 gallons per hour was obtained with the material having a grind rating of 8 on the North scale. On this run the pressure within the chamber was 4 p.s.i. On the next run using this same material in the sealed type chamber construction of the invention, the pump speed was increased to an output of 38 gallons per hour which increased the chamber pressure to 5½ p.s.i. and produced a material having a value of 7½ on the North scale.

On a third run using this material, the pump was run at full speed producing an output of 69 gallons per hour and increasing the chamber pressure to 9 pounds p.s.i. On this run the grind dropped to a rating of 4½ on the North scale. However, this run demonstrated the output rate that is obtainable using the mill of the present invention and where a coarser grind is acceptable.

To check if a sealed 3 gallon top feed mill would give the same output rate as the sealed 3 gallon bottom feed mill, the above mill base was run on similar sized sealed mills of bottom and top feed configurations.

First the sand loading plug of the top feed mill was removed and the mill base poured in. Under gravity flow an output rate of 8 gallons per hour was produced, this being the capacity of this relatively poor flowing mill base. The grind produced on this run was 8 on the North scale. The mill was then closed by replacing the sand inlet plug and an output rate of 26 gallons per hour produced a product having the same grind rating of 8. Again, at a pump output rate of 38 gallons per hour the grind produced was 7½ (North scale), and the chamber pressure 5½ p.s.i., again same as bottom feed. The two above runs at pump rates of 26 and 38 gallons were then repeated in a sealed bottom feed mill constructed according to the invention. The grinds produced were in each instance the same as for the runs with the sealed top feed mill. This proves that with the same number of impellers and the same sand charge, the same dwell time in the mill produces the same grind from either a sealed bottom feed or top feed. With the sealed mill this dwell time can be controlled to give the desired grind. Also, poor flowing premixes and high viscosity premises that heretofore had low output rates on gravity flow can now be forced through the screen under a controlled pressure in the mixing chamber, thereby producing greatly increased output rates.

EXAMPLE III

*Mill base for universal colorant paste*

Phthalo blue _____pounds__ 880
Water and mineral solvent reduceable vehicle, 85%
  solids _____do____ 600
Viscosity 124 K.u.'s at 77° F.
Grind desired for full color dispersion.

On the first run with this formula, a 27 pound sand charge was used in a 3 gallon bottom feed mill of the prior art type having an open top. The maximum output rate that could be obtained without pushing the sand out of the open top was 4½ gallons per hour. At this rate the paste produced was full of entrapped air.

On the test run using a 3 gallon bottom feed sealed mill according to the invention with a pressure of 5 p.s.i. maintained in the chamber, an output of 7 gallons per hour was produced. The paste product gave full color strength and had no air entrapped in it.

EXAMPLE IV

*Mill base for exterior trim enamel*

Titanium oxide _____pounds__ 375
Bentone 34 _____do____ 3
Thixin _____do____ 7
Ethyl alcohol _____do____ 3
Long oil alkyd, 30% vehicle solids _____do____ 185
Grind desired—6 (North scale); viscosity 90 K.u.'s at 77° F.

With the above formula, a sealed 3 gallon bottom feed mill was used having a sand charge of 30 pounds. An output rate of 40 gallons per hour was achieved with a chamber pressure of 10 p.s.i. producing material having a grind rate of 6. This particular mill base has a very slow flow rate, and in a bottom feed mill of the prior art type having an open top, 16 gallons per hour was a maximum output rate without sand overflowing the screen. The grind rating produced was 8 which was finer than required. To obtain a grind rating of 6 with the prior art type of open top mill, the sand charge had to be reduced to 18 pounds. However, on a subsequent run using a sealed mill according to my invention but of the same size, a grind having the rating of 8 was obtained at an output rate of 28 gallons per hour while a pressure of 5½ p.s.i. was maintained within the mixing chamber.

EXAMPLE V

*Mill base for one coat painter's enamel*

Non-chalking titanium oxide R.C.H.T.-4__pounds__ 312
Long oil alkyd, 60% vehicle solids_____gallons__ 24
Grind desired—7 (north scale); viscosity 110 K.u's at 77° F.

The above formula heretofore caused a lot of trouble with the open sand mills of the prior art because the varnish is a poor wetter and being one of the partially jellied type that produces almost no flow. On a run with a 3 gallon bottom feed mill with an open top, an output rate of 20 gallons per hour was obtained with the mixture rising to the top of the screen area. The upper impellers running in this heavy mixture generated a lot of heat. The temperature of the dispersed mill base at the bottom of the screen was 140° F., but at the top it was 190° F. This relatively high temperature caused a loss of solvent and also the reaction with the vehicle further restricted its flow. This problem required periodic scraping of the dispersed mill base down the discharge trough. Also the screen had to be washed inside and out about every half hour during the run.

On a later test run with this formula using a sealed 3 gallon bottom feed mill constructed according to my invention, the mixture in the screen area was kept cool and since it was discharged through a pipe, lack of flow did not prevent a steady output which was increased to 35 gallons per hour with a pressure of 9 p.s.i. in the chamber. Moreover, the mill operated without the necessity of attention by the operator, as no scraping or screen cleaning was required. This latter example demonstrated conclusively that my invention provides not only greatly increased output rates, but its unique versatility eliminates many serious problems prevalent with the prior art mills.

To those skilled in the art to which this invention relates, many changes in construction and widely differing embodiments and applications of the invention will suggest themselves without departing from the spirit and scope of the invention. The disclosures and description herein are purely illustrative and are not intended to be in any sense limiting.

I claim:

1. Apparatus of the type utilizing the agitation of a grinding media for deagglomerating and dispersing particulate solids in liquid, comprising:
- (a) a vertical cylindrical vessel having upper and lower end closures;
- (b) means providing fluid inlet and outlet connections respectively at said upper and lower end closures in the otherwise completely enclosed vessel, the fluid connection at the uppermost of said closures being so positioned as to form an escape path for air adjacent the associated closure;
- (c) a rotatable power shaft in said vessel extending along the cylindrical axis thereof and having a driving end extending through one of said end closures in pressurized fluid sealed relation thereto;
- (d) a series of spaced apart impeller structures within said vessel attached to said shaft and being positioned in a flow path between said inlet and outlet connections;
- (e) a removable screen structure mounted in the flow path between the impeller structures and said outlet connection for removing the grinding media from the processed material; and
- (f) pump means for creating a pressure differential between the inlet and outlet connections for forcing the material to be processed to fill the vessel substantially completely between its end closures and deliver a desired controlled rate of flow of material at the outlet which has been processed substantially out of contact with air.

2. Apparatus of the type utilizing the agitation grinding media particles for deagglomerating and dispersing particulate solids in liquid, comprising:
- (a) a vertical cylindrical vessel having upper and lower end closures;
- (b) means respectively providing a fluid inlet connection at the lower end closure and an outlet connection at said upper end closure, the vessel being completely enclosed except for said inlet and outlet connections and said outlet closure being positioned so as to carry off any air adjacent the inner surface of the upper end closure;
- (c) a rotatable power shaft in a said vessel extending along the cylindrical axis thereof and having a driving end extending through the upper end closure in pressurized fluid sealed relation thereto;
- (d) a series of spaced apart impeller structures within said vessel attached to said shaft and being positioned in a flow path between said inlet and outlet connections;
- (e) a removable screen structure mounted at the upper end of said vessel with its uppermost end connected to and closed with respect to the upper end closure and being positioned in the flow path between the adjacent impeller structures and said outlet connection for removing the grinding media particles from the processed material, said outlet connection being positioned at the upper end of said screen structure; and
- (f) pump means for creating a pressure differential between the inlet connection and outlet connection for forcing the material to be processed upwardly through the vessel and to substantially completely fill the vessel including the areas adjacent said end closures, and deliver a desired controlled rate of flow of material at the outlet which has been processed out of substantial contact with air.

3. Apparatus of the type utilizing the agitation of particles of a grinding media for deagglomerating and dispersing particulate solids in liquid, comprising:
- (a) a lower housing assembly providing a vertical cylindrical mixing chamber of predetermined diameter having an open upper end, and closed lower end associated with a fluid inlet;
- (b) an upper housing assembly removably connected as a unit to the upper end of the lower housing assembly, said upper housing assembly including:
  a top closure,
  an outer wall extending from said top closure,
  an inwardly spaced arcuate inner wall section forming an extension of said mixing chamber and cooperating with a portion of the outer wall to form a fluid circulating jacket, a screen for removing grinding media extending above the open end of the mixing chamber, said screen being inwardly spaced from and cooperating with a portion of said outer wall to provide a discharge chamber having communication with a fluid outlet;
- (c) a rotatable power shaft in a said mixing chamber extending along the cylindrical axis thereof and having a driving end extending through the top closure of said upper housing assembly in fluid sealed relation thereto;
- (d) a series of spaced apart impeller structures within said upper and lower housing assemblies attached to said shaft and being positioned in a flow path between said fluid inlet and said fluid outlet; and
- (e) pump means for creating a pressure differential between said fluid inlet and said fluid outlet for forcing material to be processed through said chamber and said screen, and delivering a desired controlled rate of flow of material at the outlet which has been processed out of substantial contact with air.

References Cited by the Examiner

UNITED STATES PATENTS

| 2,019,454 | 10/1935 | Larsen | 241—172 X |
| 2,022,384 | 11/1935 | Paffen | 259—122 |
| 2,137,328 | 11/1938 | Bissell | 308—36.1 |
| 2,581,414 | 1/1952 | Hochberg | 241—22 |
| 2,626,840 | 1/1953 | Laurent | 308—36.3 |
| 2,746,779 | 5/1956 | Lobanoff | 286—11.3 |
| 2,855,156 | 10/1958 | Hochberg et al. | 241—74 |
| 3,134,549 | 5/1964 | Quackenbush et al. | 241—74 |
| 3,172,609 | 3/1965 | Olsen | 241—172 |

ROBERT C. RIORDON, *Primary Examiner.*

DONALD L. MAXSON, *Examiner.*

H. F. PEPPER, *Assistant Examiner.*

PO-1050
(5/69)

UNITED STATES PATENT OFFICE
CERTIFICATE OF CORRECTION

Patent No. 3,243,128        Dated March 29, 1966

Inventor(s) DEXTER J. TIGHT

It is certified that error appears in the above-identified patent and that said Letters Patent are hereby corrected as shown below:

Column 11, line 39, for "closure" read --connection--.

SIGNED AND
SEALED
SEP 30 1969

(SEAL)
Attest:

Edward M. Fletcher, Jr.
Attesting Officer

WILLIAM E. SCHUYLER, JR.
Commissioner of Patents